United States Patent [19]

Kruka et al.

[11] Patent Number: 4,837,751
[45] Date of Patent: Jun. 6, 1989

[54] SHIELDED HYDROPHONE ASSEMBLY

[75] Inventors: Vitold R. Kruka; Robert M. Kipp; Edward R. Cadena, all of Houston, Tex.

[73] Assignee: Shell Oil Company, Houston, Tex.

[21] Appl. No.: 333,525

[22] Filed: Dec. 22, 1981

[51] Int. Cl.⁴ .............................................. G01V 1/38
[52] U.S. Cl. .................... 367/154; 367/153
[58] Field of Search ............. 367/152, 154, 157, 165, 367/166, 21, 15, 162, 153, 167, , 177, 150, 155; 181/.05, 242, 207; 310/326

[56] References Cited

U.S. PATENT DOCUMENTS

| 1,348,826 | 8/1920 | Fessenden | 367/153 |
| 2,754,925 | 7/1956 | Burke | 367/152 |
| 3,518,677 | 6/1970 | Florian | 367/154 |
| 3,737,004 | 6/1973 | Higgs | 367/152 |
| 3,781,778 | 12/1973 | Sawin et al. | 367/152 |
| 4,388,711 | 6/1983 | Fay | 367/154 |
| 4,445,207 | 4/1984 | Sternberg | 367/150 |

FOREIGN PATENT DOCUMENTS 878087  9/1961  United Kingdom ............... 367/161

Primary Examiner—Thomas H. Tarcza
Assistant Examiner—Gregory C. Issing

[57] ABSTRACT

A hydrophone assembly for use in a marine streamer cable comprising a housing adapted to be mounted in the cable, such housing having a cavity containing a moldable material, an acoustic energy transducer positioned in the moldable material and a rigid body positioned adjacent to the housing such that the rigid body covers a portion of the cavity.

7 Claims, 1 Drawing Sheet

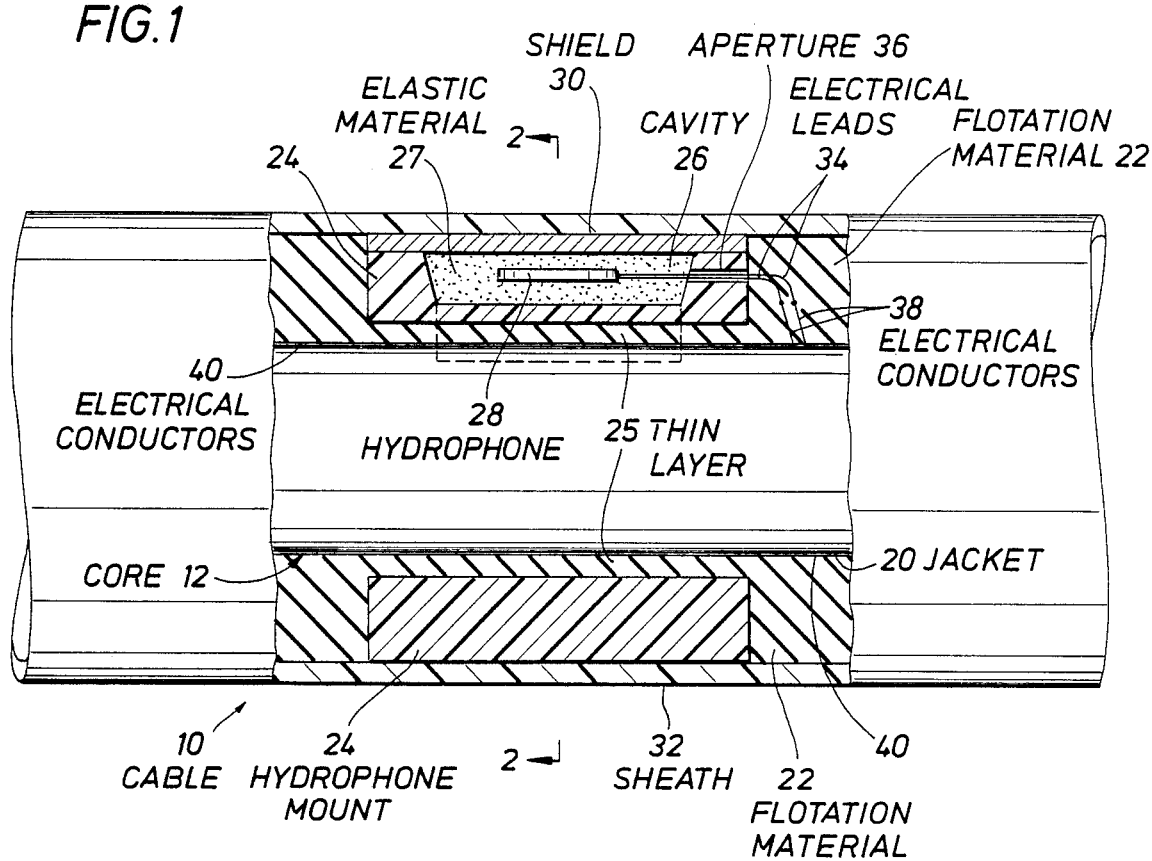
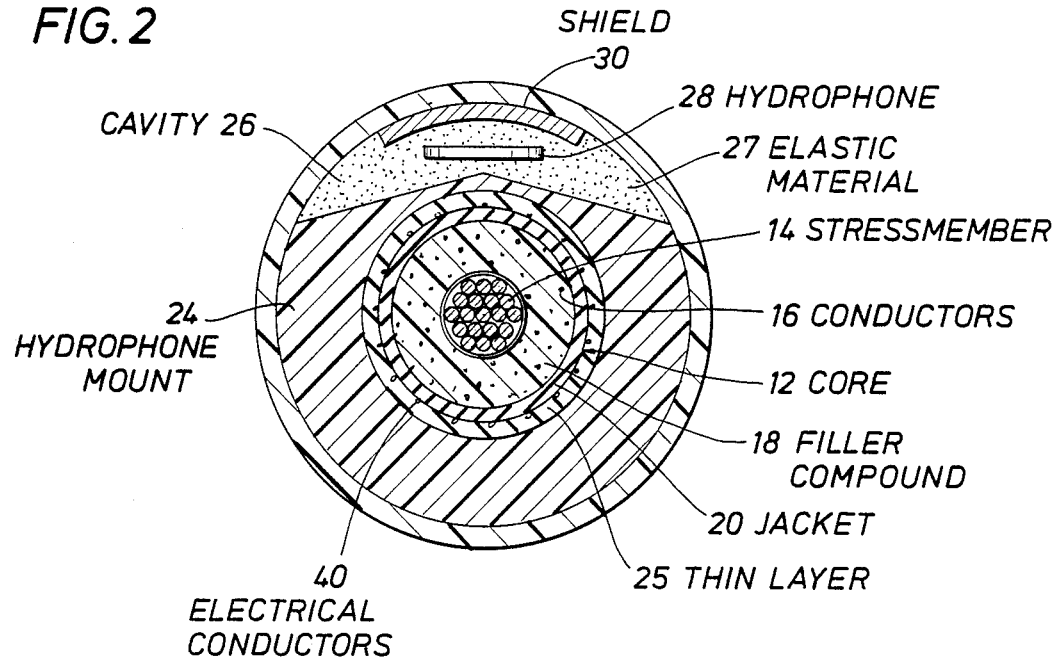

SHIELDED HYDROPHONE ASSEMBLY

BACKGROUND OF THE INVENTION

This invention relates generally to seismic exploration of substrata beneath bodies of water and, more particularly, to a hydrophone assembly for use in a seismic streamer for exploring such substrata.

Marine seismic exploration is often conducted by towing a seismic streamer at a given depth through the ocean or other body of water. The streamer is provided with a plurality of acoustic sensitive transducers, i.e., hydrophones, disposed at appropriate intervals along the length thereof. Acoustic wave energy is provided in the vicinity of the cable by an air gun or other suitable means; this wave energy travels downwardly through the earth with a portion of it being reflected upwardly at levels where there is a contrast in the velocity propagation characteristics of the strata. The hydrophones sense the acoustic pressure waves produced in the water by the upwardly traveling seismic reflections and provide electrical signals indicative thereof to suitable processing and recording equipment located on the seismic vessel that is towing the streamer.

The magnitude of the reflected signals is extremely small, thus making it essential to minimize extraneous noise detected by the hydrophones and to maximize the signal-to-noise ratio. One source of such noise is boundary layer or flow noise which is generated by the water flowing past the surface of the cable in a turbulent fashion. It has been found that flow noise is essentially a localized pressure disturbance, which is normal to the surface of the cable, and that flow noise does not propagate in the water in the acoustic sense but rather is convected by the water flowing past the cable.

Prior art hydrophone mounts, such as that disclosed in U.S. Pat. No. 3,781,778, have a cavity in which the hydrophone is positioned in an elastic material, for example, polysulfide elastomer. A thin sheet of plastic film is positioned over the cavity, and a sheath or jacket of extruded plastic is provided over the outside of the cable and the mount. The flow noise or pressure fluctuations are transmitted through the cable sheath, the thin plastic sheet and elastic material to the hydrophone, thus being detected as undesired noise.

Therefore, it is an object of the present invention to provide a hydrophone assembly that reduces the flow noise sensed by a hydrophone mounted in a marine streamer.

SUMMARY OF THE INVENTION

In accordance with the present invention there is provided a hydrophone assembly for use in a marine cable comprising a housing adapted to be mounted in the cable, such housing having a cavity containing a moldable material; an acoustic energy transducer positioned in the moldable material and a rigid body positioned adjacent to the housing such that the rigid body covers a portion of the cavity.

The present invention employs a rigid body or shield positioned adjacent to the hydrophone mount, and preferably attached thereto, to prevent flow noise, which consists of pressure fluctuations having short wavelengths and occurring normal to the surface of the cable, from propagating through the elastic medium in the mount to the hydrophone. The shield is sized so that it covers only part of the cavity in which the hydrophone is mounted, thereby allowing the desired seismic signals, which consist of long wavelengths that encompass more of the cable than the shorter wavelengths of the flow noise, to be propagated through the elastic medium to the hydrophone. In the preferred embodiment, the shield may be curved and sized such that the hydrophone falls within the area defined by the arc determined by the shield and radii extending from the center of the cable to the ends of the arc defined by the shield. This embodiment shields or isolates the hydrophone from the perpendicularly incident flow noise and provides the maximum unshielded area of the cavity to allow the desired seismic reflections to propagate through the elastic material to the hydrophone. Preferably, the cavity in which the hydrophone is mounted is shaped so that the sides of the cavity are lower than the center of the cavity to maximize the area through which the seismic signals can be transmitted to the hydrophone. The thicker portion of the mount under the center of the cavity provides the necessary rigidity to minimize the noise transmitted to the hydrophone from the cable core.

Although the present invention is described hereinbelow in reference to a solid, foam-filled cable having a cylindrical mount, it should be understood that the novel aspects of the invention have much broader application and may be applied to oil-filled cables and other types of mounts. Other objectives, advantages and applications of the present invention will be made apparent by the following detailed description of the preferred embodiments of the present invention.

BRIEF DESCRIPTION OF THE DRAWINGS

FIG. 1 is a sectional view in side elevation of a seismic streamer utilizing the present invention.

FIG. 2 is a cross section taken along line 2—2 of FIG. 1.

DETAILED DESCRIPTION OF THE PREFERRED EMBODIMENTS

Referring to FIGS. 1 and 2, a section of a marine seismic cable utilizing the present invention is indicated generally by numeral 10. Cable 10 has a core 12 which consists of a stress member 14, which can be a flexible steel cable or a synthetic fiber rope, and a plurality of electrical conductors 16 disposed around stress member 14. The voids between conductors 16 are filled with a suitable filler compound 18, and a jacket 20 of urethane or other suitable material is extruded over the outer portion of conductors 16 and filler 18. Core 12 is disposed axially within a cylindrical body of flotation material 22, such as soft urethane having embedded glass or plastic microspheres or balloons, to provide the desired buoyancy.

At discrete locations along cable 10 a portion of flotation material 22 is removed so that a cylindrical hydrophone mount 24 can be positioned around the thin layer 25 of flotation material 22 remaining around core 12. Mount 24 has an inside diameter that is substantially the same as the outside diameter of thin layer 25 of flotation material 22 and an outside diameter that is substantially the same as the outside diameter of flotation material 22. Preferably, mount 24 is a split mount having two interlocking halves which are held together by two pins which are inserted through aligned apertures in the interlocking halves, as described in our copending U.S. patent application, Ser. No. 333,527, and the sizes of thin layer 25 of flotation material 22 and mount 24 are defined by the equation $$R_1R_3^2 + R_1R_2^2 - 2R_2^3 = 0$$

where $R_1$ is the radius of core 12 and $R_2$ and $R_3$ are the inside and outside radii, respectively, of mount 24, as described in our copending U.S. patent application, Ser. No. 333,526, now U.S. Pat. No. 4,510,588, issued Apr. 9, 1985, both of which were filed on the same day as the instant application and are assigned to a common assignee.

Mount 24 can be formed of a rigid material, such as rigid polyurethane with embedded hollow glass spheres, and has a cavity 26 which is filled with a moldable, elastic material 27 having acoustic properties similar to those of the marine environment, such as polysulfide elastomer. Hydrophone 28 is positioned in elastic material 27 such that it is displaced from the walls of cavity 26. Electrical leads 34 from hydrophone 28 are brought out through aperture 36 in the wall of mount 24 and are connected in a suitable manner to a pair of electrical conductors 38 from the set of electrical conductors 40 provided by the termination (not shown) of this cable section. Preferably, cavity 26 is shaped so that its sides are lower than its center, as indicated in FIG. 2, to maximize the area through which the seismic signals can be transmitted through elastic material 27 to hydrophone 28.

A shield 30 is positioned adjacent mount 24 at cavity 26 and preferably is attached to mount 24 by epoxy or other suitable means. A sheath 32 of extruded plastic, for example, polyurethane plastic, is provided over shield 30, mount 24 and flotation material 22 to protect the outer surface of cable 10. Shield 30 can be made of any rigid material, such as steel, which does not deform or respond to pressure fluctuations at the surface of cable 10 caused by the fluid flowing past sheath 32. Obviously, the thickness of shield 30 is determined by the type of material used and the geometry of mount 24 and shield 30. Preferably, shield 30 is curved, thus making it stiffer and facilitating the extrusion of sheath 32 over it. shield 30 may be any length provided that it furnishes a rigid structure that does not deform under local pressure fluctuations, and it should be at least as wide as hydrophone 28 to prevent local pressure fluctuations from affecting hydrophone 28. The width of shield 30 is less than the width of cavity 26 so that seismic signals can be propagated through elastic material 27 and detected by hydrophone 28. In the preferred embodiment, shield 30 is sized that hydrophone 28 falls within the area defined by the arc determined by shield 30 and radii extending from the center of core 12 to the ends of the arc defined by shield 30.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. A hydrophone assembly for use in a marine cable, said hydrophone assembly comprising:
   a housing adapted to be mounted in said cable, said housing having a cavity containing a moldable material;
   an acoustic energy transducer positioned in said moldable material; and
   a rigid body positioned adjacent to said housing such that said rigid body covers a sufficient portion of said cavity to radially screen said transfer from the exterior of said cable and to physically block flow noise pressures from reaching said transducer.

2. A hydrophone assembly as recited in claim 1, wherein said rigid body is attached to said housing.

3. A hydrophone assembly as recited in claim 2, wherein said rigid body is a curved plate.

4. A hydrophone assembly as recited in claim 3, wherein said rigid body comprises a steel plate.

5. A hydrophone assembly for use in a marine cable, comprising:
   a housing adapted to be mounted in said cable and having therein a cavity containing moldable material;
   said cavity being shaped to have sides that are lower than the center of said cavity;
   an acoustic energy tranducer positioned in said moldable material; and
   a curved plate attached to said housing such that said plate severs a portion of said cavity and covers an area greater than the area of said acoustic energy transducer and said acoustic energy transducer lies within the area defined by the arc of said plate and radii extending from the center of the cable to the edges of said arc of said plate.

6. A hydrophone assembly for use in a marine cable, comprising:
   a housing having a cavity therein for containing moldable material and mountable in said cable;
   an acoustic energy transducer located in said moldable material; and
   means for substantially physically blocking local pressures from flow noise disposed between said transducer and the outer surface of said cable.

7. A method for reducing flow noise in a marine cable having at least one hydrophone therein, comprising:
   radially blocking pressures from said flow noise between the surface of said cable and said hydrophone.

* * * * *